United States Patent
Smith et al.

(10) Patent No.: US 10,214,273 B1
(45) Date of Patent: Feb. 26, 2019

(54) SYSTEM AND METHOD FOR CONTROLLING PROPULSION OF A MARINE VESSEL

(71) Applicant: Brunswick Corporation, Mettawa, IL (US)

(72) Inventors: Joshua S. Smith, Mayville, WI (US); Theodore J. Hanes, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/886,572

(22) Filed: Feb. 1, 2018

(51) Int. Cl.
| | |
|---|---|
| B63H 23/08 | (2006.01) |
| B63H 20/10 | (2006.01) |
| B63H 20/20 | (2006.01) |
| B63H 20/30 | (2006.01) |
| B63H 5/125 | (2006.01) |
| B63J 99/00 | (2009.01) |
| B63H 23/30 | (2006.01) |
| F16H 63/50 | (2006.01) |
| F16H 3/02 | (2006.01) |
| F02D 29/02 | (2006.01) |

(52) U.S. Cl.
CPC ............ *B63H 23/08* (2013.01); *B63H 5/125* (2013.01); *B63H 20/10* (2013.01); *B63H 20/20* (2013.01); *B63H 23/30* (2013.01); *B63J 99/00* (2013.01); *F16H 63/50* (2013.01); *B63J 2099/006* (2013.01); *F02D 29/02* (2013.01); *F16H 3/02* (2013.01); *Y10S 903/902* (2013.01)

(58) Field of Classification Search
CPC ........ B63H 23/08; B63H 5/125; B63H 20/10; B63H 20/20; B63H 23/30; B63J 99/00; B63J 2099/006; F16H 63/50; F16H 3/02; F02D 29/02; Y10S 903/902
USPC .......................................................... 701/21
See application file for complete search history.

(56) References Cited

U.S. PATENT DOCUMENTS

| | | | |
|---|---|---|---|
| 4,872,857 A | 10/1989 | Newman et al. | |
| 6,234,853 B1 | 5/2001 | Lanyi et al. | |
| 7,267,068 B2 | 9/2007 | Bradley et al. | |
| 7,467,595 B1 | 12/2008 | Lanyi et al. | |
| 8,622,777 B1 | 1/2014 | McNalley et al. | |
| 9,434,460 B1 | 9/2016 | Samples et al. | |
| 9,944,375 B1 * | 4/2018 | Martin | B63H 20/10 |
| 2016/0068247 A1 * | 3/2016 | Morvillo | B63H 20/08 |
| | | | 701/21 |

* cited by examiner

*Primary Examiner* — Marthe Y Marc-Coleman
(74) *Attorney, Agent, or Firm* — Andrus Intellectual Property Law, LLP

(57) ABSTRACT

A method of controlling reverse thrust by a propulsion device on a marine vessel includes determining that the propulsion device is situated to effectuate a reverse thrust and determining an initial trim position of the propulsion device. An engine RPM or an engine torque of the propulsion device is then controlled to effectuate a reverse thrust, and a trim position of the propulsion device is monitored. If a threshold increase in trim position from the initial trim position is detected at an increased engine RPM or an increased engine torque, then a reverse thrust limit is calculated based on the increased engine RPM or increased engine torque. The engine RPM of the propulsion device is then controlled so as not to exceed the reverse thrust limit while the propulsion device is effectuating the reverse thrust.

20 Claims, 7 Drawing Sheets

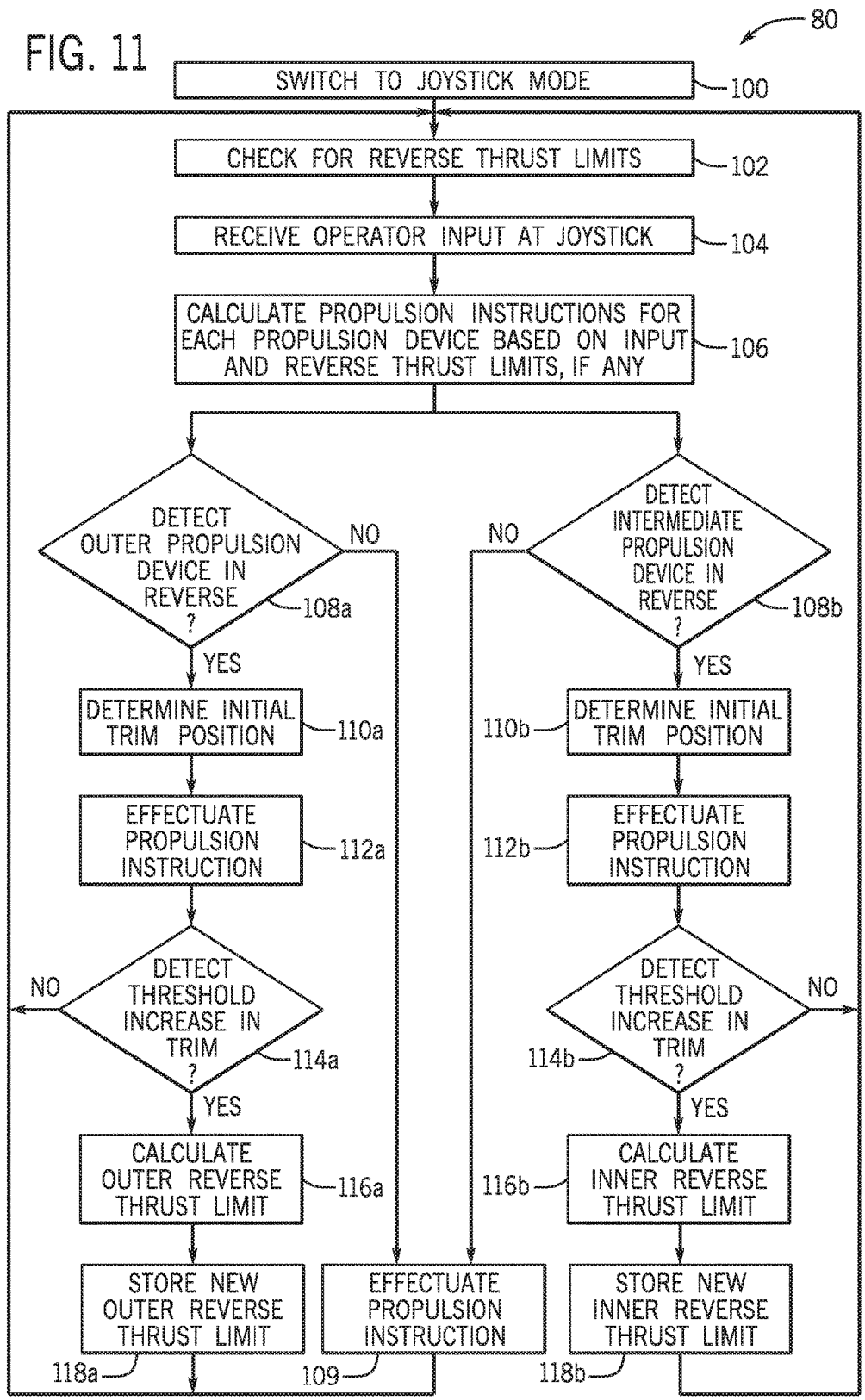

SYSTEM AND METHOD FOR CONTROLLING PROPULSION OF A MARINE VESSEL

FIELD

The present application relates to marine vessels and particularly to propulsion control systems for maneuvering marine vessels.

BACKGROUND

The following U.S. Patents and Applications provide background information and are incorporated herein by reference in entirety.

U.S. Pat. No. 4,872,857, which is hereby incorporated herein by reference in entirety, discloses a system for optimizing the operation of a marine drive unit the position of which is independently variable by separately operable trim and vertical lift systems. The system includes trim and lift position sensors, the output signals of which are stored by the control system, such that the trim and lift positions for any previously established drive unit operating mode may be subsequently used to automatically return the drive unit to that particular position. Automatic repositioning is accomplished by manual selection of one of several operating modes, such as trolling, acceleration, or cruising. Automatic movement to a pre-established uppermost trailering position may also be provided. The system includes appropriate controls based on sensed boat speed (MPH) or engine speed (RPM) to preclude return to one of the pre-established operating positions when such return would be impractical or potentially hazardous.

U.S. Pat. No. 6,234,853, which is hereby incorporated herein by reference in entirety, discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system uses two marine propulsion units to respond to an operator's command signal and allows the operator to select forward or reverse commands in combination with clockwise or counterclockwise rotational commands either in combination with each other or alone.

U.S. Pat. No. 6,322,404, incorporated by reference herein, discloses a Hall effect rotational position sensor is mounted on a pivotable member of a marine propulsion system and a rotatable portion of the rotational position sensor is attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

U.S. Pat. No. 7,267,068, which is hereby incorporated herein by reference in entirety, discloses a marine vessel maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,416,456, incorporated by reference herein, discloses an automatic trim control system changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 7,467,595, which is hereby incorporated herein by reference in entirety, discloses a method for controlling the movement of a marine vessel that rotates one of a pair of marine propulsion devices and controls the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

U.S. Pat. No. 8,622,777, which is hereby incorporated herein by reference in entirety, discloses a system for maneuvering a marine vessel comprises an input device for requesting a reverse thrust of a marine propulsion device and a control circuit that, based upon the request for the reverse thrust from the input device, controls movement of the marine propulsion device into a trim position wherein the marine propulsion device provides a reverse thrust that is not impeded by a hull of the marine vessel. Optionally, the input device can comprise a joystick.

U.S. Pat. No. 9,434,460, which is hereby incorporated herein by reference in entirety, discloses systems for maneuvering a marine vessel including an input device for requesting lateral movement of the marine vessel with respect to the longitudinal axis and a plurality of propulsion devices including at least a port propulsion device, a starboard propulsion device and an intermediate propulsion device disposed between the port and starboard propulsion devices. A control circuit controls orientation of the port and starboard propulsion devices inwardly towards a common point on the marine vessel, and upon a request for lateral movement of from the input device, operates one of the port and starboard propulsion devices in forward gear, operates the other of the port and starboard propulsion devices in reverse gear, and operates the intermediate propulsion device in reverse gear.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A method of controlling reverse thrust by a propulsion device on a marine vessel includes determining that the propulsion device is situated to effectuate a reverse thrust and determining an initial trim position of the propulsion device. An engine RPM or an engine torque of the propulsion device is then controlled to effectuate a reverse thrust, and a trim position of the propulsion device is monitored. If a threshold increase in trim position from the initial trim position is detected at an increased engine RPM or an increased engine torque, then a reverse thrust limit is calculated based on the increased engine RPM or increased engine torque. The engine RPM of the propulsion device is then controlled so as not to exceed the reverse thrust limit while the propulsion device is effectuating the reverse thrust.

One embodiment of a system for controlling propulsion of a marine vessel includes a propulsion device having an engine that causes rotation of a propulsor and a gear system disposed between the engine and the propulsor. The gear system is moveable to a forward position to transmit forward rotation to the propulsor so as to effectuate a forward thrust, and a reverse position to transmit reverse rotation to the propulsor so as to effectuate a reverse thrust. The system further includes a trim sensor sensing a trim position of the propulsion device, and a control circuit configured to detect trail out and calculate a reverse thrust limit accordingly. Specifically, the control circuit is configured to determine that the gear system is in the reverse position and to determine an initial trim position of the propulsion device. The control circuit controls an engine RPM or an engine torque to effectuate reverse thrust based on input from an operator. If, based on input from the trim sensor, the control circuit detects a threshold increase in trim position at an increased RPM or an increased engine torque, then a reverse thrust limit is calculated based on the increased engine RPM or the increased engine torque at which the threshold increase in trim position is detected. The control circuit then controls the propulsion device so as not to exceed the reverse thrust limit when the gear system is in the reverse position.

In another embodiment, a system for controlling propulsion of the marine vessel includes first and second propulsion devices located on each of a port side and a starboard side of a center line of the marine vessel, wherein the first and second propulsion devices are spaced symmetrically with respect to the center line. The system further includes at least a third propulsion device positioned between the first and second propulsion devices. First, second, and third trim actuators are coupled to each of the first, second, and third propulsion devices, respectively. Likewise, first, second, and third trim sensors sense a trim position of the first, second, and third propulsion devices, respectively. The system further includes a control circuit that defines the first and second propulsion devices as outer propulsion devices and the third propulsion device as an intermediate propulsion device. A user input device is in signal communication with the control circuit, wherein the user input device is operable by a user to control magnitude and direction of propulsion by the first, second, and third propulsion devices. The control circuit is configured to determine that at least one of the first, second, or third, propulsion devices is in reverse to effectuate a reverse thrust, and then to determine an initial trim position of the at least one propulsion device in reverse. The control circuit controls an engine RPM or an engine torque of the propulsion device in reverse to effectuate a reverse thrust. While doing so, the control circuit monitors trim positioned measured by the trim system in order to detect a threshold increase in trim position from the initial trim position. Once the threshold increase in trim position is detected at an increased engine RPM or increased engine torque, a reverse thrust limit is calculated for the at least one propulsion device in reverse based on the increased engine RPM or increased engine torque. The first, second, and third propulsion devices are then controlled based on input at the user input device and the reverse thrust limit so that the at least one propulsion device in reverse does not exceed the reverse thrust limit.

Various other features, objects, and advantages of the invention will be made apparent from the following description taken together with the drawings.

BRIEF DESCRIPTION OF THE DRAWINGS

The present disclosure is described with reference to the following Figures.

FIG. 11 is a flow chart depicting one example of a method of controlling reverse thrust by multiple propulsion devices on a marine vessel.

DETAILED DESCRIPTION

Figure 2:
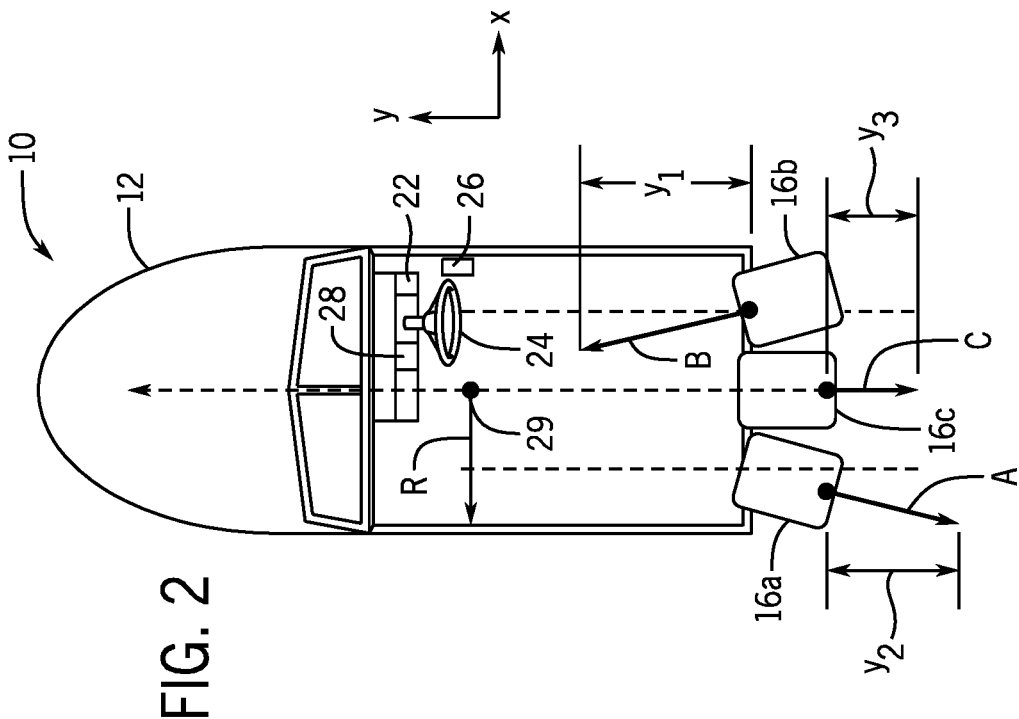
FIG. 2 is a schematic depiction of a marine vessel having the plurality of marine propulsion devices wherein port and starboard propulsion devices are oriented inwardly towards a common point.

The present disclosure results from research and development of systems for maneuvering marine vessels. The present inventors have determined that in systems having three or more trimmable propulsion devices located at the stern of the vessel, such as outboard or stern drives, and particularly in systems having three or more propulsion devices, responsivity of the systems to requests for movement in certain directions, such as lateral movement, is often limited by the limited reverse thrust capabilities of one of the port or starboard propulsion devices. More specifically, upon a request for lateral movement of the marine vessel, which is input via for example a joystick, both port and starboard propulsion devices are typically turned inwardly towards a center of gravity or center of turn of the marine vessel. One of the port and starboard devices is operated in reverse gear and the other in forward gear, depending upon the direction of lateral movement that is requested.

Through their experimentation and research, the inventors have recognized that several factors limit the reverse thrust capabilities of propulsion devices, which in turn limit the amount of thrust that can be provided by the forwardly-operating devices during certain joysticking maneuvers. That is, the system cannot utilize the maximum thrust capability of the forwardly-operating device(s) and still equalize the thrust vectors in order to move the marine vessel in the direction instructed by the operator. This is especially the case in executing movement in the lateral direction to achieve a requested lateral thrust vector, and hence cancelling out the thrust vectors in the longitudinal direction (i.e., the forward and reverse thrust vectors). A major limiting factor recognized by the inventors is that most trim systems are only capable of maintaining a set trim position under a certain load caused by reverse thrust. Accordingly, at a certain reverse thrust, a propulsion device will begin to trim out because the reverse thrust forces are overpowering the ability of the trim system to maintain the trim position of the marine vessel.

In presently-available systems, trail out is avoided by blindly limiting the maximum reverse thrust of all propulsion devices to a value sufficiently below the thrust limit where trail out might occur. This unnecessarily limits the maximum output of the propulsion system during certain maneuvers where all or the majority of longitudinal thrust is cancelled out, such as in lateral movement of the marine vessel. The inventors have realized that this artificially-low output limit is an inefficient use of the capabilities of the propulsion devices. Through experimentation, it has been found that systems with these limitations often provide less than the maximum possible responsivity to requests for transverse movement, especially in situations where relatively large amounts of wind and/or waves are acting on the vessel in the lateral direction and it is desired to maintain a position of the marine vessel, or for example when a large amount of acceleration in the lateral direction is requested.

The inventors have recognized that not all propulsion devices of a multi-device propulsion system on a marine vessel will have the same reverse thrust limit. The amount of reverse thrust that a particular trim system can handle is largely a product of the moment arm between the point of rotation at the trim system and the propulsor effectuating the thrust, such as the propeller. In propulsion systems having multiple propulsion devices, the outer propulsion devices are typically shorter and the inner propulsion devices are typically longer the trim systems for the one or more inner propulsion devices will be overcome at a lower thrust limit at the propeller than the outer propulsion devices, which have a shorter moment arm.

Figure 3:
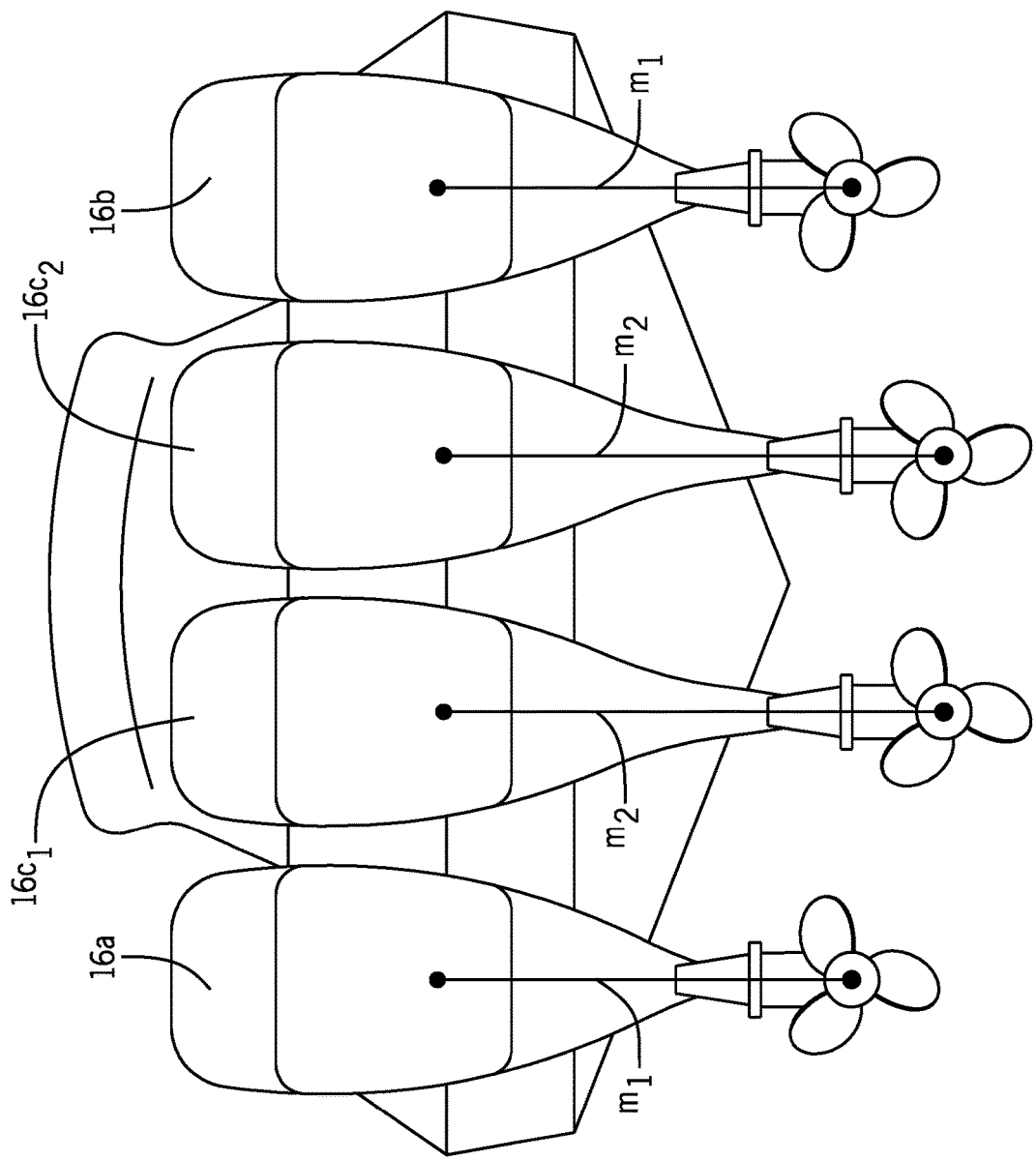
FIG. 3 is a rear view of an exemplary propulsion system comprising four propulsion devices mounted on a transom of a marine vessel.

FIG. 3 exemplifies a typical arrangement of four outboard marine propulsion devices $16a$, $16b$, $16c_1$, $16c_2$ mounted on a marine vessel 12. As shown, the port outer propulsion device $16a$ and the starboard outer propulsion device $16b$ are shorter than the intermediate, or inner, propulsion devices $16c_1$ and $16c_2$. Likewise the outer propulsion devices $16a$ and $16b$ have a shorter moment arm $M_1$ between the propulsor and the point of rotation at the mount than the moment arm $M_2$ of the intermediate propulsion devices $16c_1$ and $16c_2$. Due to their shorter moment arm $M_1$, the outer propulsion devices $16a$ and $16b$ will be able to achieve a higher engine RPM or engine torque and effectuate a greater reverse thrust, as compared to the intermediate propulsion devices, before overpowering the trim system and forcing an increase in trim position.

Accordingly, the thrust limit for avoiding trail out, which can be translated into a limit on the engine RPM or engine torque when the propulsion device is in reverse, will be higher for the outer propulsion devices $16a$ and $15b$ than the limit for the intermediate propulsion device(s) $16c$. This can be important for certain propulsion maneuvers which, as described in more detail below, require a greater thrust (and thus higher engine RPM and engine torque) from the outer propulsion devices than the inner propulsion device(s).

Moreover, the inventors have also recognized that other factors, in addition to the length of the propulsion device, can impact the amount of reverse thrust tolerated by a trim system before trail out occurs, examples of which include propeller configuration, trim position, and the configuration and/or condition of individual trim systems connected to each propulsion device, and the like. Accordingly, the inventors have recognizes that a blanket RPM limitation for all propulsion devices operating in reverse is inappropriate, and that operation of the propulsion system 10 can be improved by determining an actual reverse RPM value or engine torque value where trail out occurs for a particular propulsion device on a particular marine vessel arrangement, and setting a reverse thrust limit accordingly.

The increase in trim position due to reverse thrust overpowering the trim system, sometimes referred to as "trail out," can be detected by monitoring the trim position measured by the trim sensor $34a$, $34b$, $34c$ in order to detect unwanted change in trim position—e.g., a threshold increase in trim position not commanded by the respective trim control module $31a$, $31b$, $31c$. Accordingly, the inventors have recognized that such trim measurements can be used to detect trail out and to set individual limits, such as RPM limits or engine torque limits, for operating each propulsion device in reverse (i.e., a "reverse thrust limit"), where the reverse thrust limit is determined for each particular propulsion device and corresponding trim system in order to avoid trail out. Thus, in a system having three or more propulsion devices, the reverse thrust limit will be higher for the outer propulsion devices than for the inner propulsion device. As will be understood by a person having ordinary skill in the art in light of the present disclosure, the reverse thrust limit may be a limit on any value controllable to control the thrust output of the propulsion device. Other examples include, but are not limited to, throttle valve position, fueling parameters, electric motor current, etc. Likewise, an ordinary skilled person will also understand in light of this disclosure that the engine RPM or engine torque refer also to speed and torque of an electric motor or hybrid system.

FIGS. 1-9 depict components of a propulsion system 10 for maneuvering and orienting a marine vessel 12. The system 10 includes, among other things, a control circuit 14 (see FIG. 9) for controlling the rotational position about a steering axis, trim position, and thrust generation of a plurality of marine propulsion devices $16a$, $16b$, $16c$ based upon inputs from an input device. It should be understood that the particular configurations of the system 10 and marine vessel 12 are exemplary. It is possible to apply the concepts described in the present disclosure with substantially different configurations for systems for maneuvering and orienting marine vessels and with substantially different marine vessels.

For example, the control circuit 14 (see FIG. 9) is shown in simplified schematic form and has a plurality of command control modules (CCM) $18a$, $18b$, $18c$ located at a helm 19 of the marine vessel 12 that communicate with respective engine control modules $20a$, $20b$, $20c$ associated with each marine propulsion device $16a$, $16b$, $16c$; steering control modules $21a$, $21b$, $21c$ associated with steering actuators $23a$, $23b$, $23c$ for steering each marine propulsion device $16a$, $16b$, $16c$; and trim control modules $31a$, $31b$, $31c$, associated with trim actuators $33a$, $33b$, $33c$ for changing the trim angles of each marine propulsion device $16a$, $16b$, $16c$. However, the control circuit 14 can have any number of modules (including, for example, the methods and functions described herein may be carried out by one control module) and can be located remotely from or at different locations in the marine vessel 12 from that shown. For example, the trim control modules $31a$, $31b$, $31c$ can be co-located with and/or part of the engine control modules $20a$, $20b$, $20c$ (as shown);

or can be located separately from the respective engine control modules 20a, 20b, 20c. Other similar modifications of this type can be made. It should also be understood that the concepts disclosed in the present disclosure are capable of being implemented with different types of control systems, including systems that acquire global position data and real time positioning data, such as for example global positioning systems, inertial measurement units, and/or the like.

Further, certain types of input devices such as a joystick 22, a steering wheel 24, a shift/throttle lever 26, and a keypad 28 are described. It should be understood that the present disclosure is applicable with other numbers and types of input devices such as video screens, touchscreens, voice command modules, and the like. It should also be understood that the concepts disclosed in the present disclosure are able to function in a preprogrammed format without user input or in conjunction with different types of input devices, as would be known to one of ordinary skill in the art. Further equivalents, alternatives and modifications are possible as would be recognized by one of ordinary skill in the art.

Further, a marine vessel 12 having three (i.e. port, intermediate and starboard) marine propulsion devices is described; however, the concepts of the present disclosure are applicable to marine vessels having any number of marine propulsion devices. For example, the methods and functions described herein may be implemented for propulsion systems 10 having just one propulsion device, or propulsion systems 10 having two propulsion devices. Configurations with more than three marine propulsion devices are also contemplated. Parts of this disclosure and claims refer to a "propulsion device". These descriptions are intended to equally apply to arrangements having "one or more propulsion devices." The concepts in the present disclosure are also applicable to marine vessels having any type or trimmable configuration of propulsion device, such as for example electric motors, internal combustion engines, and/or hybrid systems, and may be configured as an outboard drive, inboard/outboard drive, stern drive, and/or the like. The propulsion devices can include any different type of propulsor, such as propellers, impellers, pod drives and/or the like.

Figure 1:
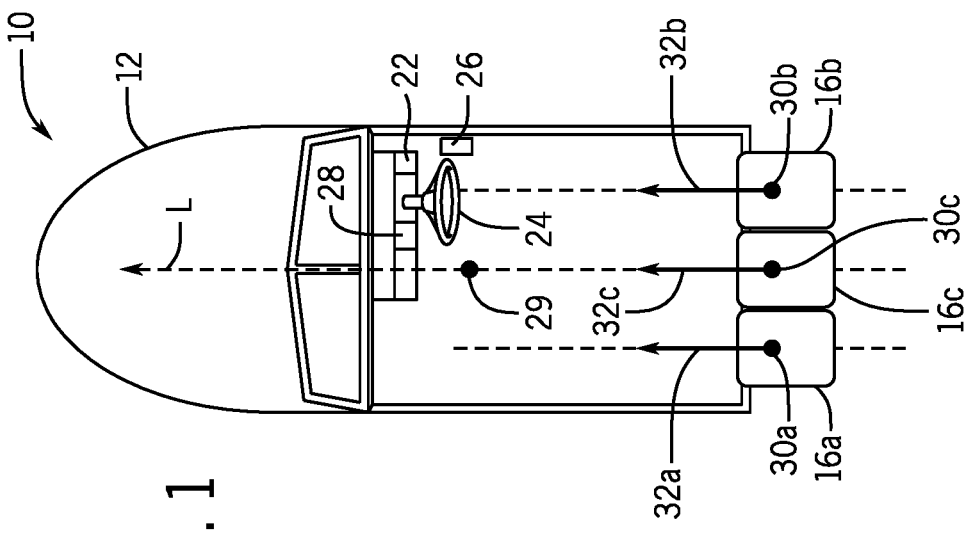
FIG. 1 is a schematic depiction of a marine vessel having a plurality of marine propulsion devices in an aligned position.

In FIGS. 1 and 2, a marine vessel 12 is schematically illustrated having port, starboard, and intermediate propulsion devices 16a, 16b, 16c, which in the example shown are outboard drives. Again, the number of propulsion devices can vary from that shown. The intermediate propulsion device 16c is disposed between the port and starboard propulsion devices 16a, 16b. As used in this description and the appended claims, the term "disposed between" is to be given its broadest possible meaning, including arrangements wherein the intermediate propulsion device is located fore or aft of one or both of the port and starboard propulsion devices 16a, 16b. The term "disposed between" also includes arrangements wherein the intermediate propulsion device 16c is located at different elevation from the port and starboard devices 16b, 16c. The term "disposed between" also includes arrangements wherein the intermediate propulsion device 16c is located closer to one of the port and starboard devices 16a, 16b than the other of the port and starboard devices 16a, 16b.

The marine propulsion devices 16a, 16b, 16c are each rotatable in clockwise and counterclockwise directions through a substantially similar range of rotation about respective steering axes 30a, 30b, 30c. As shown in FIG. 1, the steering axis 30c is located along the longitudinal axis, which is a longitudinal centerline of the marine vessel 12. Rotation of the marine propulsion devices 16a, 16b, 16c is facilitated by conventional steering actuators 23a, 23b, 23c (see FIG. 9). Steering actuators for rotating marine propulsion devices are well known in the art, examples of which are provided in U.S. Pat. No. 7,467,595, the disclosure of which is hereby incorporated by reference in entirety. Each marine propulsion device 16a, 16b, 16c creates propulsive thrust in both forward and reverse directions. FIG. 1 shows the marine propulsion devices 16a, 16b, 16c operating in forward gear, such that resultant forwardly acting thrust vectors 32a, 32b, 32c on the marine vessel 12 are produced; however, it should be recognized that the propulsion devices 16a, 16b, 16c could also be operated in reverse gear and thus provide oppositely oriented (reversely acting) thrust vectors on the vessel 12.

As shown in FIG. 1, the propulsion devices 16a, 16b, 16c are aligned in a longitudinal direction L to thereby define the thrust vectors 32a, 32b, 32c extending in the longitudinal direction L. The particular orientation shown in FIG. 1 is typically employed to achieve a forward or backward movement of the marine vessel 12 in the longitudinal direction L or a rotational movement of the vessel 12 with respect to the longitudinal direction L. Specifically, operation of the propulsion devices 16a, 16b, 16c in forward gear causes the marine vessel 12 to move forwardly in the longitudinal direction L. Conversely, operation of propulsion devices 16a, 16b, 16c in reverse gear causes the marine vessel 12 to move reversely in the longitudinal direction L. Further, operation of one of propulsion devices 16a, 16b in forward gear and the other in reverse gear causes rotation of the marine vessel 12 about a center of turn 29 for the marine vessel 12. In this example intermediate propulsion device 16b is shifted into neutral gear. Various other maneuvering strategies and mechanisms are described in the incorporated U.S. Pat. Nos. 6,234,853, 7,267,068; and 7,467,595.

In this example, the center of turn 29 represents an effective center of gravity for the marine vessel 12. However it will be understood by those having ordinary skill in the art that the location of the center of turn 29 is not, in all cases, the actual center of gravity of the marine vessel 12. That is, the center of turn 29 can be located at a different location than the actual center of gravity that would be calculated by analyzing the weight distribution of various components of the marine vessel 12. Maneuvering a marine vessel 12 in a body of water results in reactive forces exerted against the hull of the marine vessel 12 by the wind and the water. For example, as various maneuvering thrusts are exerted by the marine propulsion devices 16a, 16b, 16c, the hull of the marine vessel 12 pushes against the water and the water exerts a reaction force against the hull. As a result, the center of turn identified at 29 in FIGS. 1 and 2 can change in response to different sets of forces and reactions exerted on the hull of the marine vessel 12. This concept is recognized by those skilled in the art and is referred to as the instantaneous center of turn in U.S. Pat. No. 6,234,853; and as the instantaneous center in U.S. Pat. No. 6,994,046.

As shown in FIG. 2, the marine propulsion devices 16a and 16b are rotated out of the aligned position shown in FIG. 1 so that the marine propulsion devices 16a, 16b and their resultant thrust vectors 32a, 32b are not aligned in the longitudinal direction L. In the example shown in FIG. 2, the marine propulsion devices 16a, 16b are splayed inwardly and operated so as to provide thrust vectors 32a, 32b that are aligned with a common point, which in this example is the center of turn 29. In addition to the example shown in FIG. 2, various other unaligned positions and relative different or the same amounts of thrust of the marine propulsion devices 16a, 16b are possible to achieve one or both of a rotational movement and movement of the marine vessel 12 in any direction, including perpendicularly to the longitudinal direction L.

The marine vessel 12 also includes a helm 19 (see FIG. 9) where a user can input commands for maneuvering the marine vessel 12 via one or more input devices. As discussed above, the number and type of input devices can vary from the example shown. In FIGS. 1 and 2, the input devices include the joystick 22, steering wheel 24, shift and throttle lever 26 and keypad 28. Rotation of the steering wheel 24 in a clockwise direction requests clockwise rotation or yaw of the marine vessel 12 about the center of turn 29. Rotation of the steering wheel 24 in the counter-clockwise direction requests counterclockwise rotation or yaw of the marine vessel 12 about the center of turn 29. Forward pivoting of the shift and throttle lever 26 away from the neutral position requests forward gear and requests increased throttle. Rearward pivoting of the shift and throttle lever 26 away from a neutral position requests reverse gear and requests increasing rearward throttle. Actuation of the keypad 28 inputs user-requested operational mode selections to the control circuit 14, as will be discussed further herein below.

Figure 4:
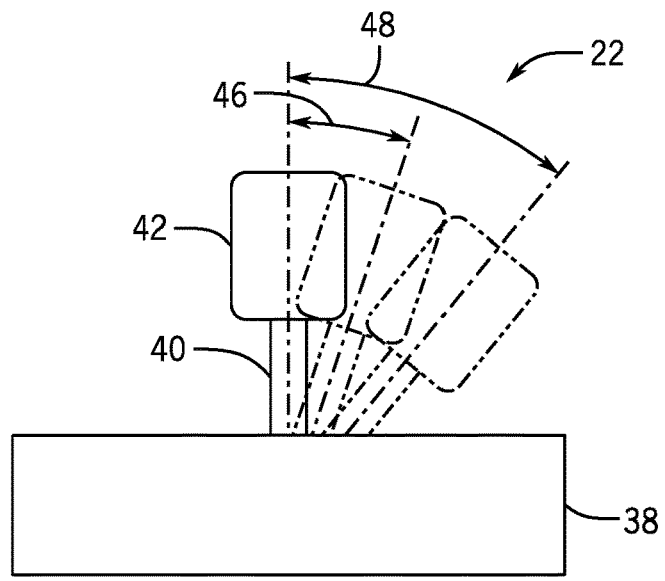
FIG. 4 is a side view of an input device in the form of a joystick.
Figure 5:
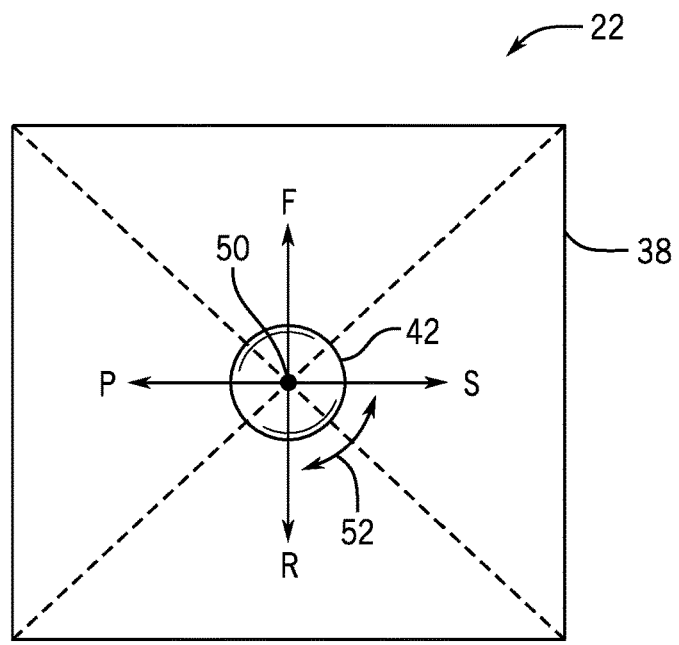
FIG. 5 is a top view of the joystick shown in FIG. 4.

A schematic depiction of a joystick 22 is depicted in FIGS. 4-5. The joystick 22 includes a base 38, a shaft 40 extending vertically upwardly relative to the base 38, and a handle 42 located on top of the shaft 40. The shaft 40 is movable, as represented by dashed-line arrow 44 in numerous directions relative to the base 38. FIG. 4 illustrates the shaft 40 and handle 42 in three different positions which vary by the magnitude of angular movement. Arrows 46 and 48 show different magnitudes of movement. The degree and direction of movement away from the generally vertical position of the joystick represents an analogous magnitude and direction of an actual movement command selected by a user. FIG. 5 is a top view of the joystick 22 in which the handle 42 is in a central, vertical, or neutral position. The handle 42 can be manually manipulated in a forward F, reverse R, port P or starboard S direction or a combination of these to provide actual movement commands into F, R, P, S directions or any other direction therebetween. In addition, the handle 42 can be rotated about the centerline 50 of the shaft 40 as represented by arrow 52 to request rotational movement or yaw of the vessel 12 about the center of turn 29. Clockwise rotation of the handle 42 requests clockwise rotation of the marine vessel 12 about the center of turn 29, whereas counterclockwise rotation of the handle 42 requests counterclockwise rotation of the vessel about the center of turn 29. Various other joystick structures and operations are described in the incorporated U.S. Pat. Nos. 6,234,853; 7,267,068; and 7,467,595.

Figure 6:
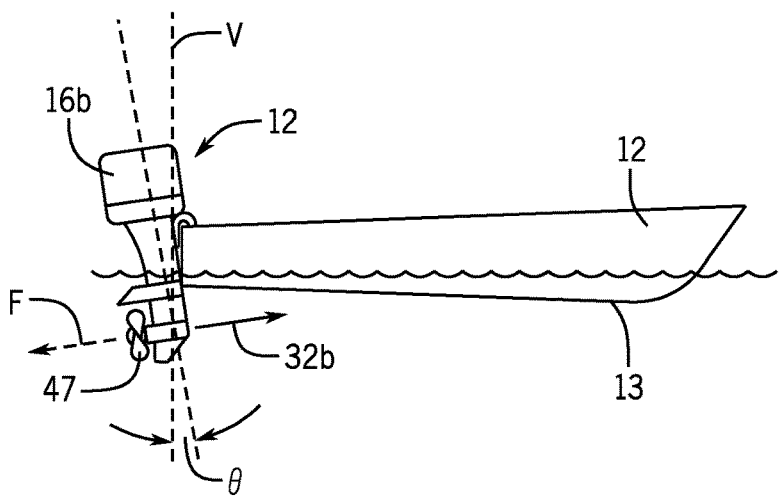
FIG. 6 is a side view of a marine vessel having at least one marine propulsion device in a first trim position that is fully trimmed down.
Figure 7:
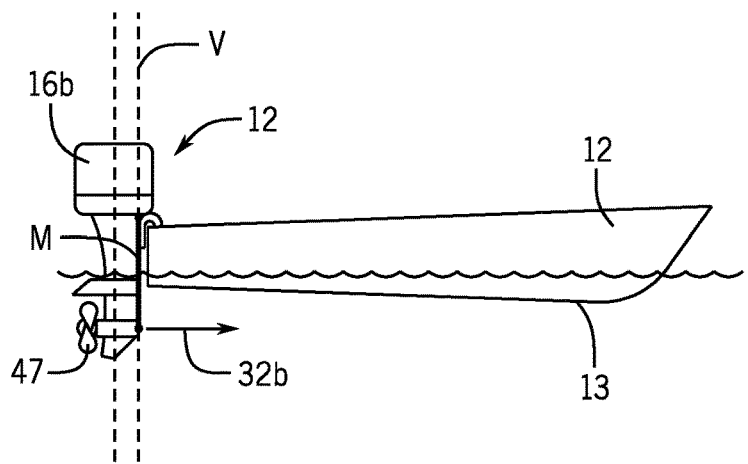
FIG. 7 is a side view of a marine vessel having at least one propulsion device in a second trim position that is not fully trimmed down.
Figure 8:
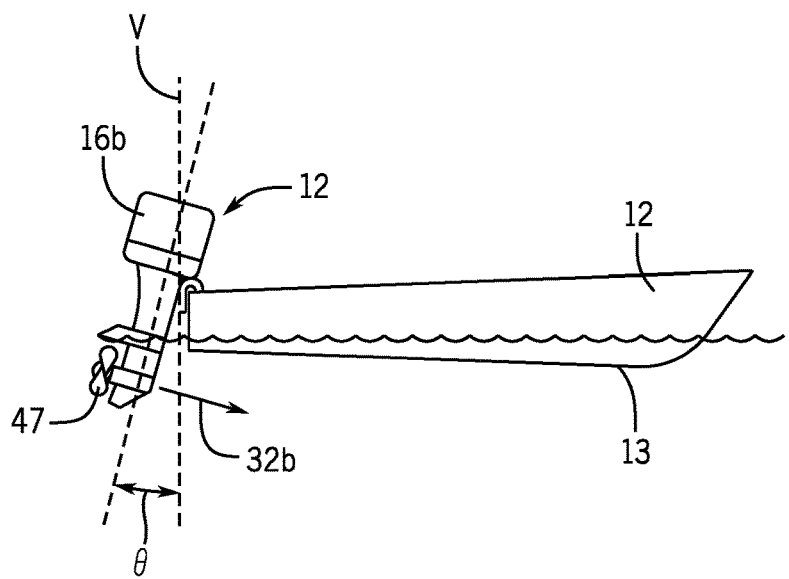
FIG. 8 is a side view of a marine vessel having at least one propulsion device in a third trim position that is trimmed up.

FIGS. 6-8 are schematic side views of the marine vessel 12 having at least one propulsion device 16. FIG. 6 depicts the marine propulsion devices 16a, 16b (only 16b is shown in side view) in a fully trimmed down trim position (or sometimes referred to as fully "trimmed in"). Specifically, the angle of the center line of the propulsion device 16b in a trimmed down position is at angle −θ with respect to the vertical line V aligned with the stern of the marine vessel 12. The trim position depicted in FIG. 6 is a position that is conventionally utilized during initial forward acceleration (or launch) of the marine vessel 12 until full forward translation wherein the vessel 12 is on-plane. During such initial forward acceleration, the propulsor 47 (in this example a propeller) rotates forwardly to provide forward thrust shown in dashed line at F to propel the marine vessel forwardly. Once the marine vessel 12 is in full forward translation and on plane, the marine propulsion devices 16a, 16b are typically trimmed back out of the trim position shown in FIG. 6, usually back past the vertical axis V to a slightly raised trim position that achieves, for example, optimal speed or fuel economy or other desired performance characteristics. FIG. 8 depicts the marine vessel 12 with the propulsion device 16b in a trimmed up (or sometimes referred to as "trimmed out") position, where the angle of the center line of the propulsion device is at angle θ with respect to the vertical line V aligned with the stern of the marine vessel 12. FIG. 7 shows the marine vessel 12 with the propulsion device 16b in a neutral position, where the center line of the propulsion device is aligned with the vertical line V and with the stern of the marine vessel 12.

Once the marine vessel 12 is slowed to a stop, the trim angle of the marine propulsion devices 16a, 16b typically does not change. In other words, the propulsion devices 16a, 16b remain in the trim position shown in FIG. 6 if the vessel 12 was slowed before it was on plane and in full forward translation or remain in the trimmed-out position shown in FIG. 8 away from vertical if the vessel 12 was slowed from full forward translation.

When a reverse thrust is requested at the user input device 22, 26, 28, such as in joysticking where a lateral or reverse thrust is requested, one or more of the propulsion devices 16a-16c situates itself to effectuate a reverse thrust. For example, where present, a gear system 45a-45c of the respective propulsion device 16a-16c shifts into reverse position in order to effectuate a reverse thrust. Specifically, each gear system 45a, 45b, 45c effectuates rotation from a driveshaft to a propulsor shaft connected to a propulsor 47a, 47b, 47c. Each gear system 45a, 45b, 45c is operable to vary engagement between the drive shaft and the propulsor shaft between forward, neutral, and reverse positions. In the forward position, the propulsor 47a, 47b, 47c is rotated in a direction to effectuate a forward thrust on the marine vessel 12. In the reverse position, the propulsor 47a, 47b, 47c is rotated in the reverse direction to effectuate a reverse thrust on the marine vessel 12. In the neutral position, the propulsor shaft is not engaged and no thrust is effectuated. In various embodiments, the propulsor 47a, 47b, 47c may include a single propeller, a double propeller, more than two propellers, one or more impellers, and/or any other similar devices for creating thrust force in water to propel marine vessel 12. As is known in the art, the gear system 45 may include any clutch mechanism, including a dog clutch, cone clutch, and brake, or other type of friction clutch, or may include any other type of transmission system. Other embodiments, such as in the case where the respective propulsion device(s) 16 is an electric motor, no gear system may be present and the motor may be capable of generating rotation in both directions.

As described above, such actuation of a reverse thrust may be by only portion of the propulsion devices 16a-16c, such as one of the outer propulsion devices 16a or 16b in response to a lateral or rotational steering instruction at the joystick 22. Upon shifting into the reverse position, the reverse thrust 32b is effectuated. Depending on the angle θ of the trim position with respect to vertical V, the thrust vector 32b may have a vertical component (as in FIGS. 6 and 8). Especially in the trimmed-out position exemplified in FIG. 8, a strong reverse thrust vector 32b can have the effect of overpowering the trim actuator 33b, which changes the trim position to increase the angle θ with respect to the vertical V. Such a change in trim position, or trail out, can also be caused at the trimmed-in position exemplified in FIG. 6 and the neutral position exemplified in FIG. 7. Such change in trim position introduced unwanted inefficiencies in the system, as thrust is absorbed by the trim actuator 33. Moreover, once trail out has begun, the magnitude of the change in trim position will only increase until the reverse thrust is decreased so as to not overpower the trim system. Especially in the trimmed-out position exemplified in FIG. 8, significant increase in trim position decreases the effectiveness of the thrust and, in extreme circumstances, can even lead to cavitation. This increase in trim angle away from the desired trim position can be determined based on input from the trim sensor 34b sensing the trim position of the respective propulsion device 16b.

Figure 9:
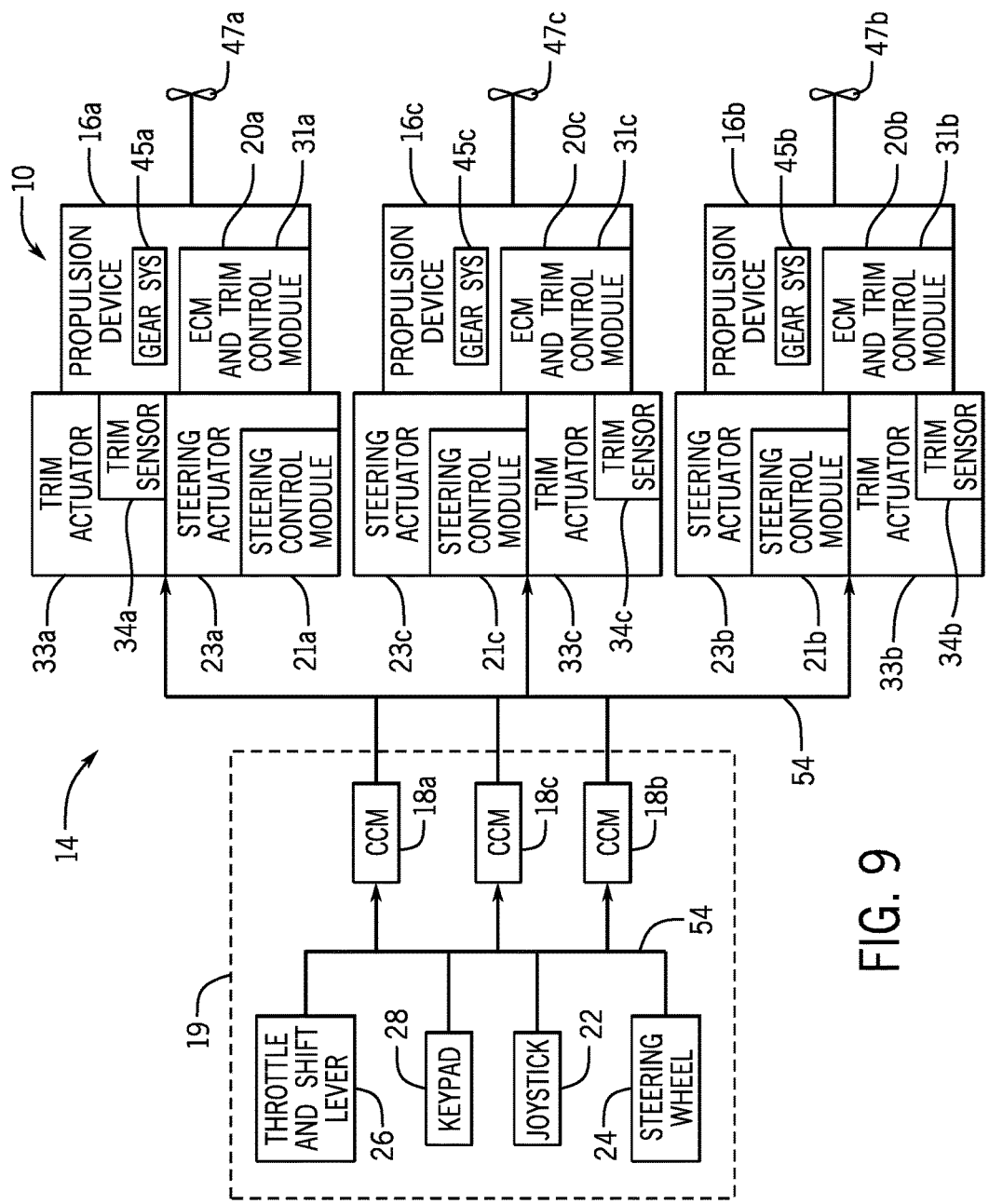
FIG. 9 is a schematic of an exemplary control system for controlling propulsion of a marine vessel.

Referring to FIG. 9 the user input devices 22, 24, 26 and 28 communicate with the control circuit 14, which in the example shown is part of a controller area network (CAN bus) 54. It is not required that the user input devices 22, 24, 26 and 28 communicate with the control circuit 14 via the CAN bus 54. For example, one or more of these items can be connected to the control circuit by a dedicated hard wire or wireless connection. The control circuit is programmed to control operation of marine propulsion devices 16a, 16b, 16c and the steering actuators and trim actuators associated therewith. As discussed above, the control circuit 14 can have different forms. In the example shown, the control circuit 14 includes a plurality of command control modules 18a, 18b, 18c located at the helm 19. A command control module 18a, 18b, 18c is provided for each of the port, starboard and intermediate marine propulsion devices 16a, 16b, 16c. It should be understood that one control module, such as one helm control module, may encompass the CCMs 18a, 18b, 18c, and that such a helm control module may execute the methods and provide the functionality described herein as being performed by the separate CCMs 18a, 18b, 18c. The control circuit 14 also includes engine control modules 20a, 20b, 20c located at and controlling operation of each respective propulsion device 16a, 16b, 16c, a steering control module 21a, 21b, 21c located at and controlling operation of each steering actuator 23a, 23b, 23c, and a trim control module 31a, 31b, 31c located at the respective engine control modules 20a, 20b, 20c and controlling operation of each trim actuator 33a, 33b, 33c. In another example, the trim control modules 31a, 31b, 31c can be located apart from the engine control modules 20a, 20b, 20c, respectively. Each control module has a memory and a processor for sending and receiving electronic control signals, for communicating with other control circuits in the controller area network 54, and for controlling operations of certain components in the system 10 such as the operation and positioning of marine propulsion devices and related steering actuators and trim actuators. Examples of the programming and operations of the control circuit 14 and its modules are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and non-substantial differences or changes still fall within the scope of the disclosure.

In the example shown, each command control module 18a, 18b, 18c receives user inputs via the controller area network 54 from the joystick 22, steering wheel 24, shift and throttle lever 26, and keypad 28. As stated above, the joystick 22, steering wheel 24, shift and throttle lever 26, and keypad 28 could instead by wired directly to the CCM 18a, 18b, 18c instead of via the CAN bus 54. Each command control module 18a, 18b, 18c is programmed to convert the user inputs into electronic commands and then send the commands to other control circuit modules in the system 10, including the ECMs 20a, 20b, 20c and related steering control modules and trim control modules. For example, when the shift and throttle lever 26 is actuated, as described above, each command control module 18a, 18b, 18c sends commands to the respective ECM 20a, 20b, 20c to achieve the requested change in throttle and/or shift, including by controlling the engine RPM or engine thrust accordingly. Rotation of the shift and throttle lever in the aftward direction will request reverse shift and thrust of the marine propulsion devices 16a, 16b, 16c to achieve reverse movement of the marine vessel 12. Further, when the steering wheel 24 is actuated, as described above, each command control module 18a, 18b, 18c sends commands to the respective steering control modules 21a, 21b, 21c to achieve the requested change in steering. When the joystick 22 is moved out of its vertical position, each command control module 18a, 18b, 18c sends commands to the respective engine control modules 20a, 20b, 20c and/or steering control modules 21a, 21b, 21c to achieve a movement commensurate with the joystick 22 movement. When the handle 42 of the joystick 22 is rotated, each command control module 18a, 18b, 18c sends commands to the respective steering control module 21a, 21b, 21c to achieve the requested vessel yaw or rotation. Movement of the joystick 22 out of its vertical position effectively engages a "joystick mode" wherein the control circuit 14 controls operation and positioning of the marine propulsion devices 16a, 16b, 16c based upon movement of the joystick 22. In another example, "joystick mode" can be actuated by user input to the keypad 28 or other input device.

In the exemplary embodiment shown in FIGS. 1 and 2, the joystick 22 is operable to request lateral movement of the marine vessel 12 with respect to the longitudinal axis L. Lateral movement can be understood to be any movement of the vessel 12 in a direction that is not parallel to the longitudinal direction L. In the exemplary embodiment, the lateral movement R (FIG. 2) that is requested is normal to the longitudinal direction L; however other lateral movements could be requested and acted upon according to the concepts of the present disclosure. When joystick mode is initiated, or when the lateral movement is requested by the user, the control circuit 14 controls orientation of the port and starboard propulsion devices 16a, 16b inwardly as shown so as to create propulsive thrusts along respective axes that intersect at a common point on the marine vessel 12, which in the example shown is the center of turn of the marine vessel 12. In other examples, the common point could be, for example, the center of gravity of the marine vessel or some other common point. The control circuit 14 further operates one of the port and starboard propulsion devices 16a, 16b in forward gear so as to apply a forward thrust vector on the marine vessel 12. The other of the port and starboard propulsion devices 16a, 16b is operated in reverse gear so as to provide a reverse thrust vector on the marine vessel 12. As shown, the propulsive thrusts on the marine vessel 12 extend along axes that are transverse to the longitudinal axis L.

In the example shown in FIG. 2, the joystick 22 is operated to achieve the port lateral movement thrust vector R that is normal to the longitudinal axis L. In this example, the control circuit 14 controls the starboard propulsion device 16b into forward gear to provide a forward effective thrust vector on the marine vessel 12, as shown by arrow B. The control circuit 14 also controls the port device 16a into reverse gear so as to apply a reverse thrust vector on the marine vessel 12, as shown at arrow A. It will be understood by those having ordinary skill in the art that requests by the joystick 22 for lateral movement in different directions will effect different shift and thrust commands to the propulsion devices 16a, 16b to achieve such a lateral movement. For example, the thrust vectors A and B shown in FIG. 2 would be oppositely oriented for a request for opposite (i.e. starboard) lateral movement of the marine vessel 12 normal to the longitudinal axis L.

As shown in FIG. 2, upon initiation of joystick mode, or upon a request for lateral movement of the marine vessel 12, the control circuit 14 controls orientation of the intermediate propulsion device 16c into alignment (i.e. parallel) with the longitudinal axis L. The intermediate propulsion device 16c is thus oriented so as to provide a resultant thrust vector C on the vessel 12 that is aligned with the same common point (here the center of turn 29) to which the port and starboard propulsion devices 16a, 16b are oriented. The control circuit 14, upon the request for lateral movement from the joystick 22, controls the intermediate propulsion device 16c into reverse gear to apply a reversely acting thrust vector C on the marine vessel 12. In contrast to systems which maintain the intermediate propulsion device 16c in neutral gear upon a request for lateral movement of the vessel 12, the present inventors have recognized that operating the intermediate propulsion device 16c in reverse gear allows for application of a larger forward thrust vector (e.g. B in this example) by the forwardly operating propulsion device (e.g. 16b in this example), while still achieving the requested lateral movement (R in this example). That is, the thrust vectors shown by arrows A, B, and C, together result in a net lateral force vector R that is in a direction and of a magnitude was requested by the user. Stated another way, the thrust vectors A, B and C each have y-components $y_1$, $y_2$, and $y_3$ respectively. The y-components are equalized such that $$y_1 = y_2 + y_3$$

Summation of the respective x-components of the thrust vectors A, B and C results in the vector R being applied on the marine vessel in the X-direction. In other embodiments, the intermediate propulsion device 16c may remain in the neutral gear upon the request for lateral movement of the marine vessel 12, and such lateral movement may be provided by the thrust vectors A and B of the outer propulsion devices 16a and 16b, alone.

Either way, the lateral movement of the marine vessel 12 is increased by increasing the thrust vectors A and B. In the depicted example, one of the reverse thrust vectors A and C will be the limiting factor determining the amount of lateral thrust R that can be effectuated. As disclosed herein, the reverse thrust provided by each propulsion device can be maximized by monitoring trim position of each propulsion device, and increasing the engine RPM or engine torque of each engine in accordance with the instruction provided at the user input device, such as the joystick 22, until trail out is detected at least one of the propulsion devices 16a or 16c operating in reverse. Upon detection of trail out, such as identified as a threshold increase in trim position from a desired or initial trim position, the thrust output of the respective propulsion device can be reduced, such as by reducing the engine speed or engine torque as necessary to reduce the thrust vector and eliminate the detected trail out.

The engine speed or engine torque of the remaining propulsion devices (e.g. 16b and 16c) in the system 10 are then adjusted to compensate and correlate with the reduced engine speed or engine torque of the propulsion device that was trailing out so as not to change the direction of the lateral thrust vector R. For example, if the threshold increase in trim position is detected on the outer propulsion device 16a at a particular engine RPM or engine torque, then the engine RPM or engine torque of the outer propulsion device 16a will be reduced and a reverse thrust limit will be set that is below the engine RPM or engine torque at which the trail out was detected. The operation of the remaining propulsion devices 16b and 16c may then be adjusted accordingly so as not to change the direction of the resulting thrust vector R. For example, the reverse thrust C of the intermediate propulsion device 16c may be increased by increasing the engine speed or engine torque of the intermediate propulsion device 16c and/or the forward thrust vector B may be decreased by decreasing the engine speed or engine torque of the propulsion device 16b. In such an example, maximizing the reverse thrust vector A of the outer propulsion device maximizes the lateral thrust R, as the reverse thrust of the outer propulsion device is likely the limiting factor in such a maneuver. Thus, having a reverse thrust limit for the outer propulsion device 16a that is higher than the reverse thrust limit for the intermediate propulsion device 16c is advantageous. Since the length of the outer propulsion device 16a and 16b are likely shorter than the length of the propulsion device 16c, the reverse thrust limits for the outer propulsion devices 16a and 16b will be higher than the reverse thrust limit for the intermediate device 16c.

Figure 10:
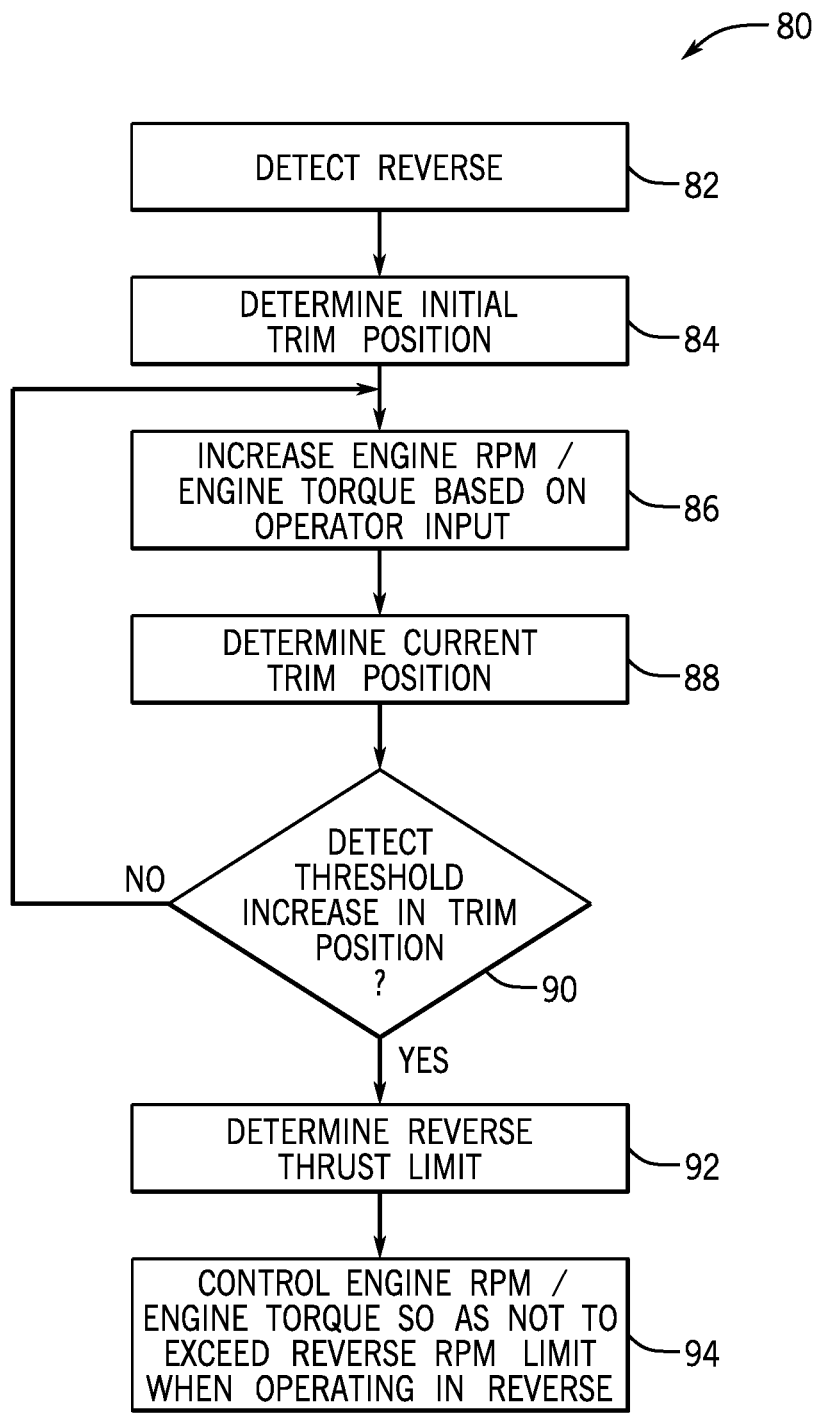
FIG. 10 is a flow chart depicting one embodiment of a method of controlling reverse thrust by a propulsion device.

FIGS. 10 and 11 depict exemplary embodiments of methods 80 of controlling reverse thrust by a propulsion system 10 on a marine vessel 12. The exemplary method steps are executed by the control circuit 14. In various embodiments, the steps may be executed by one or more of the CCMs 18a-18c (or by a helm control module), such as with input from the ECMs 20a-20c and trim control modules 31a-31c. In other embodiments, each respective ECM 20a-20c may determine its own reverse thrust limit, and may communicate its reverse thrust limit to the one or more CCMs 18a-18c calculating the steering instructions, such as during joysticking mode. In other embodiments, the ECMs 20a-20c may communicate certain values to the CCMs or to a helm control module, which then calculates and/or implements the reverse thrust limit. Other cooperative arrangements between the various control modules 18, 20, 21, 31 are possible in order to execute the steps and accomplish the functions disclosed herein.

In the flow chart of FIG. 10, operation of the propulsion device in reverse is detected at step 82, and an initial trim position is determined at step 84. For example, the initial trim position may be determined based on a current reading of the trim sensor 34 sensing the trim position of the propulsion device 16. In another embodiment, the initial trim position may be determined as a current trim setting by the trim control module 31 to control the trim actuator 33. Thereby, any instructed change in trim position by the trim control module 31 can be accounted for in the initial trim position. The propulsion device is then controlled based on operator input via one of the user input devices, including the joystick 22, the steering wheel 24, the throttle lever 26, and the keypad 28. This includes executing instructions to increase engine RPM or engine torque based on operator input, represented at step 86. As the engine RPM or engine torque is increased, the current trim position is determined at step 88, such as by monitoring the output of the trim sensor 34. As is well known, trim sensors 34a-34c are provided in association with trim actuators to measure the current trim position of the marine drive 16a-16c (or portion thereof, in the case of stern drives) relative to the fixed mounting system on the marine vessel 12, such as a Hall Effect sensor or other rotational position sensor. Various trim sensors are available and well known in the art, examples of which are described in references incorporated herein, including at U.S. Pat. No. 6,322,404.

So long as trail out is not detected, the engine RPM or engine torque can be increased according to operator input. If a threshold increase in trim position is detected at step 90, then a reverse thrust limit is determined at step 92 based on the increased engine RPM or increased engine torque value at which the trail out was detected. For example, the increased engine RPM or increased engine torque may be determined based on the engine RPM and engine torque values captured at the ECM 20 at the time that the threshold thrust increase was detected, such as based on input from an engine speed sensor, throttle position sensor, manifold pressure sensor, etc. The reverse thrust limit may then be determined by subtracting a predetermined RPM or engine torque amount from the increased engine RPM or increased engine torque. To provide just one example, the predetermined RPM amount may be 50 RPM or 100 RPM, or any other predetermined RPM value (or likewise any predetermined torque value) that is sufficient to avoid the trail out that was detected at the increased engine RPM value or increased engine torque value. Represented at step 94, the respective propulsion device 16 is then controlled to avoid exceeding the reverse thrust limit when operating in the reverse position to effectuate reverse thrust.

The threshold increase in trim and the predetermined RPM or torque amount used to arrive at the reverse thrust limit may be calibratable values established for a particular propulsion setup and marine vessel. Further, since engine RPM and engine torque often fluctuate significantly in high thrust situations, some form of filtering may be executed to determine the increased engine RPM or increased engine torque at which the trail out occurred.

FIG. 11 depicts another exemplary method of controlling reverse thrust, which is specific to a propulsion system 10 containing multiple propulsion devices 16 that include at least two outer propulsion devices 16a and 16b and at least one intermediate propulsion device 16c. In the depicted example, the operator input for controlling propulsion is the joystick 22. The system 10 is switched into joystick mode at step 100 to designate the joystick 22 as the control input device for steering and propulsion by the propulsion system 10. Step 102 is executed to check for reverse thrust limits for any of the prolusion systems that have already been determined and stored in memory. Upon initial operation no reverse thrust limits may be available. At other points, reverse thrust limits for certain propulsion devices may be available, where trail out has previously been detected, while reverse thrust limits may not be available for all propulsion devices. Even where reverse thrust limit have already been determined, the limits can be refined throughout the life cycle of the trim actuators 33a-33c and propulsion devices 16a-16c to maintain reverse thrust limit values that are specific to the current system. For example, the reverse thrust limits may be reset upon replacement of a respective trim actuator 33a-33c and/or propulsion device 16a-16c. In other embodiments, default reverse thrust limits may be available, which may be initially set to a relatively high RPM level and may be refined downward upon the detection of trail out on any of the propulsion devices.

At step 104, operator input is received at the joystick 22. Propulsion instructions are calculated for each propulsion device based on the input at the joystick 22 and based on any available reverse thrust limits. Steps 108a and 108b are executed to determine whether any reverse position is being executed by an outer propulsion device 16a or 16b and/or an intermediate propulsion device 16c. If no propulsion device is instructed to effectuate a reverse thrust, then the forward propulsion instructions are effectuated at step 109 in accordance with the operator input. If, on the other hand, reverse thrust is instructed from an outer propulsion device, then a reverse position is detected at step 108a and an initial trim position is determined at step 110a. Likewise, if reverse thrust is instructed by the one or more intermediate propulsion devices 16c, then the reverse position will be detected at step 108b and an initial trim position for the respective intermediate propulsion device is determined at step 110b. The propulsion instructions to the respective propulsion devices are then executed at steps 112a and 112b. The trim position of the propulsion devices operating in reverse are monitored based on the output of the respective trim sensor 34a-34b. If a threshold increase in trim position is detected at step 114a or 114b then, for that respective propulsion device, the reverse thrust limit is calculated. Specifically, if a threshold increase in the trim position of the outer propulsion device 16a or 16b is detected at step 114a, then an outer reverse thrust limit is determined at step 116a. The new outer reverse thrust limit is then stored at step 118a. Likewise, if the threshold increase in trim position of the intermediate propulsion device is detected at step 114b, then step 116b is executed to calculate the inner reverse thrust limit. The new inner reverse thrust limit is then stored in memory at step 118b.

Moving forward, the new inner and/or outer reverse thrust limits will be utilized in calculating propulsion instructions in the joysticking mode for all of the propulsion devices 16a-16c. In certain embodiments, an individualized reverse thrust limit may be stored for each propulsion device in the system, and thus two outer propulsion devices 16a and 16b may have differing reverse thrust limits. In other embodiments, the same outer reverse thrust limit may be applied to both outer propulsion devices 16a and 16c, such as to keep the propulsion capabilities symmetrical in both lateral directions. The same may also be true where more than one intermediate propulsion device (e.g., $16c_1$ and $16c_2$) are present in the propulsion system 10.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:
1. A method of controlling reverse thrust by a propulsion device on a marine vessel, the method comprising:
   determining, using a control circuit, that the propulsion device is situated to effectuate a reverse thrust;
   determining, using the control circuit, an initial trim position of the propulsion device;
   controlling, using the control circuit, an engine RPM or an engine torque to effectuate the reverse thrust;

detecting, using a trim sensor, a threshold increase in trim position from the initial trim position resulting at an increased engine RPM or increased engine torque;

calculating, using the control circuit, a reverse thrust limit based on the increased engine RPM or increased engine torque; and controlling the propulsion device so as not to exceed the reverse thrust limit while the propulsion device is effectuating the reverse thrust.

2. The method of claim 1, wherein the reverse thrust limit is one of a reverse thrust limit calculated by subtracting a predetermined RPM amount from the increased engine RPM or a reverse torque limit calculated by subtracting a predetermined torque amount from the increased engine torque.

3. The method of claim 1, wherein the reverse thrust limit is one of a reverse thrust limit calculated as a percentage of the increased engine RPM or a reverse torque limit calculated as a percentage of the increased engine torque.

4. The method of claim 1, wherein the initial trim position of the propulsion device is a current trim setting provided by a trim control module.

5. The method of claim 1, wherein the initial trim position is an output of the trim sensor upon shifting into a reverse gear.

6. A system for controlling propulsion of a marine vessel, the system comprising:
a propulsion device comprising:
an engine that causes rotation of a propulsor;
a gear system disposed between the engine and the propulsor, the gear system movable to a forward position to transmit forward rotation to the propulsor and effectuate a forward thrust and a reverse position to transmit reverse rotation to the propulsor and effectuate a reverse thrust;
a trim sensor sensing a trim position of the propulsion device;
a control circuit configured to:
determine that the gear system is in the reverse position;
determine an initial trim position of the propulsion device;
control an engine RPM or an engine torque to effectuate reverse thrust;
detect, based on the trim position measured by the trim sensor, a threshold increase in trim position from the initial trim position resulting at an increased engine RPM or an increased engine torque;
calculate a reverse thrust limit based on the increased engine RPM or the increased engine torque; and
control the engine so as not to exceed the reverse thrust limit when the gear system is in the reverse position.

7. The system of claim 6, wherein the reverse thrust limit is one of a the reverse thrust limit calculated by subtracting a predetermined RPM amount from the increased engine RPM or a reverse torque limit calculated by subtracting a predetermined torque amount from the increased engine torque.

8. The system of claim 6, wherein the reverse thrust limit is one of a reverse thrust limit calculated as a percentage of the increased engine RPM or a reverse torque limit calculated as a percentage of the increased engine torque.

9. The system of claim 6, wherein the control circuit is further configured to determine the initial trim position of the propulsion device based on a current trim setting provided by a trim control module.

10. The system of claim 6, wherein the control circuit is further configured to determine the initial trim position is an output of the trim sensor upon the gear system shifting into the reverse position.

11. A system for controlling propulsion of a marine vessel, the system comprising:
first and second propulsion devices located one on each of a port side and a starboard side of a centerline of the marine vessel and spaced symmetrically with respect to the centerline;
at least a third propulsion device between the first and second propulsion devices;
first, second, and third trim actuators coupled to the first, second, and third propulsion devices, respectively;
first, second, and third trim sensors sensing a trim position of the first, second, and third propulsion devices, respectively;
a control circuit that defines the first and second propulsion devices as outer propulsion devices and defines the third propulsion device as an intermediate propulsion device;
a user input device in signal communication with the control circuit, the user input device operable by a user to control magnitude and direction of propulsion by the first, second, and third propulsion devices; and
wherein the control circuit is configured to:
determine that at least one of the first, second, or third propulsion devices is in reverse to effectuate a reverse thrust;
determine an initial trim position of the at least one propulsion device in reverse;
control an engine RPM or an engine torque of the at least one propulsion device in reverse to effectuate the reverse thrust;
based on the trim position measured by the trim sensor associated with the at least one propulsion device in reverse, detect a threshold increase in trim position from the initial trim position;
identify an increased engine RPM or an increased engine torque of the at least one propulsion device in reverse at which the threshold increase in trim position is detected;
calculate a reverse thrust limit for the at least one propulsion device in reverse based on the increased engine RPM or the increased engine torque; and
control the first, second, and third propulsion devices based on input at the user input device and the reverse thrust limit so that the at least one propulsion device in reverse does not exceed the reverse thrust limit.

12. The system of claim 11, wherein the control circuit is configured to separately determine a first, second, and third reverse thrust limit for each of the first, second, and third propulsion devices, respectively.

13. The system of claim 11, wherein the first and second propulsion devices have a shorter length than the third propulsion device, wherein the control circuit is configured to determine an outer reverse thrust limit for the first and second propulsion devices.

14. The system of claim 13, wherein the user input device is a joystick, and wherein control circuit is further configured to calculate propulsion instructions for each of the first, second, and third propulsion devices based on the input at the joystick such that when either of the first or second propulsion devices are in reverse they do not exceed the outer reverse thrust limit.

15. The system of claim 13, wherein the control circuit is further configured to determine an inner reverse thrust limit for the third propulsion device, wherein the outer reverse thrust limit is higher than the inner reverse thrust limit.

16. The system of claim 15, wherein the user input device is a joystick, and wherein control circuit is further configured to calculate propulsion instructions for each of the first, second, and third propulsion devices based on the input at the joystick such that when either of the first or second propulsion devices are in reverse they do not exceed the outer reverse thrust limit, and when the third propulsion device is in reverse it does not exceed the inner reverse thrust limit.

17. The system of claim 11, wherein the control circuit is further configured to calculate the reverse thrust limit for the at least one propulsion device in reverse by subtracting a predetermined RPM amount from the increased engine RPM or by subtracting a predetermined torque amount from the increased engine torque.

18. The system of claim 11, wherein the control circuit is further configured to calculate the reverse thrust limit for the at least one propulsion device in reverse as a percentage of the increased engine RPM or the increased engine torque.

19. The system of claim 11, wherein the control circuit is further configured to determine the initial trim position of the at least one propulsion device in reverse based on a current trim setting provided by a trim control module.

20. The system of claim 11, wherein the control circuit is further configured to determine the initial trim position for the at least one propulsion device in reverse as an output of the respective trim sensor.

\* \* \* \* \*